US009792438B2

(12) United States Patent
Heldt-Sheller et al.

(10) Patent No.: US 9,792,438 B2
(45) Date of Patent: Oct. 17, 2017

(54) PROTECTING USER INPUT AGAINST FOCUS CHANGE

(71) Applicant: Intel Corporation, Santa Clara, CA (US)

(72) Inventors: Nathan Heldt-Sheller, Portland, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 14/578,730

(22) Filed: Dec. 22, 2014

(65) Prior Publication Data

US 2016/0180080 A1    Jun. 23, 2016

(51) Int. Cl.
     *G06F 21/57*    (2013.01)
     *H04L 29/06*    (2006.01)

(52) U.S. Cl.
     CPC ............ *G06F 21/57* (2013.01); *H04L 63/145* (2013.01); *G06F 2221/031* (2013.01); *G06F 2221/033* (2013.01); *G06F 2221/2111* (2013.01)

(58) Field of Classification Search
     CPC .......... G06F 21/57; G06F 3/048; G06F 21/53; G06F 21/12; G06F 21/60; G06F 7/04; H04K 1/00; H04L 9/32; H04L 9/08; H04M 1/66; H01R 24/00
     USPC .............. 726/22–27; 380/28, 249, 270, 286; 715/802
     See application file for complete search history.

(56) References Cited

U.S. PATENT DOCUMENTS

| 8,136,155 | B2 * | 3/2012 | Freund | G06F 21/53 |
| | | | | 726/22 |
| 9,129,112 | B2 * | 9/2015 | Boyer | G06F 21/57 |
| 2010/0287498 | A1 * | 11/2010 | Palgon | G06F 9/4443 |
| | | | | 715/802 |

OTHER PUBLICATIONS

U.S. Appl. No. 14/493,613, filed Sep. 23, 2014, entitled "Performing Pairing and Authentication Using Motion Information," by Ned M. Smith, et al.
Intel Corporation, "Deeper Levels of Security with Intel Identify Protection Technology," 2012, 9 pages.
U.S. Appl. No. 14/472,645, filed Aug. 29, 2014, entitled "Pairing Computing Devices According to a Multi-Level Security Protocol," by Abhilasha Bhargav-Spantzel, et al.
U.S. Appl. No. 14/493,621, filed Sep. 23, 2014, entitled "Securely Pairing Computing Devices," by Avi Priev, et al.
Frank McKeen, et al., "Innovative Instructions and Software Model for Isolated Execution," 2013, 8 pages.
Matthew Hoekstra, et al., "Using Innovative Instructions to Create Trustworthy Software Solutions," 2013, 8 pages.
Ittai Anati, et al., "Innovative Technology for CPU Based Attestation and Sealing," 2013, 7 pages.

* cited by examiner

*Primary Examiner* — Thanhnga B Truong
(74) *Attorney, Agent, or Firm* — Trop, Pruner & Hu, P.C.

(57) ABSTRACT

In an embodiment, a system includes a processor having at least one core and a security engine, the security engine having a focus change logic to inform a trusted application to be executed in a trusted execution environment of a request for a focus change during execution of the trusted application, enable the focus change to occur during execution of the trusted application when allowed by the trusted application, and otherwise to prevent the focus change. Other embodiments are described and claimed.

12 Claims, 8 Drawing Sheets

PROTECTING USER INPUT AGAINST FOCUS CHANGE

TECHNICAL FIELD

Embodiments relate to enhancing security of user input in a variety of systems.

BACKGROUND

In computing systems that provide for secure execution, a trusted path from an input device to a destination can still be vulnerable to attack. Trusted path architectures generally provide a secure data pathway from a trusted user input device to a corresponding trusted data sink. One example is a trusted path from a trusted touchscreen sensor to a trusted application (e.g., a protected email client application).

One common vulnerability is an attack on a user via a phishing attack, by shifting input focus to an untrusted application, without the user noticing. As a result, in this type of attack, a user may continue to enter sensitive information (e.g., passwords, personally identifiable information, or other confidential information) that is redirected to a malware component.

DETAILED DESCRIPTION

In various embodiments, a focus change management logic is provided. Such logic may execute underneath an operating system (OS) and other system software. This logic may be configured to operate when a trusted application is in execution, to ensure that an undesired focus change during the trusted application execution does not occur, at least without the approval of the trusted application and/or an authenticated user.

In various embodiments, a protection logic of a security processor such as a security engine of a general-purpose processor may enable protection via this focus change manager (FCM) logic. This protection logic and corresponding FCM may be interposed between one or more user input devices and an OS layer. FCM logic, in an embodiment, also may be referred to herein as a policy manager, and interacts with all of user input device(s), trusted application(s), and OS. According to embodiments, once a trusted application opens a trusted input session with the FCM and thus receives focus, the trusted application is to intentionally release focus back to the OS before user input via the one or more user input devices can be provided to an entity other than the trusted application (e.g., via one or more untrusted channels).

With a secure channel between user input device and trusted application under control of the FCM, the trusted application can then use the trusted channel itself to reliably confirm that the user is aware of an impending focus change. That is, should a request for focus change be received in the OS during this FCM-established session, the request is passed to the FCM, which in turn seeks permission of the trusted application before enabling any focus change. As such, the trusted application may request and reliably trust user input to confirm that the request for focus change is allowed by the authenticated user. For example, the trusted application may seek user input, such as seeking user input of an authorization (e.g., "OK") over the trusted channel, an acknowledgment that malware cannot spoof.

Using an architecture as described herein, an OS can be excluded from a trusted computing base (TCB), easing complexity and improving security. Still further, embodiments provide an application-defined policy associated with input focus change, which may provide for greater enforcement than an OS-defined focus change policy, since the application is more likely to have available context information to determine a correct policy. For example, a trusted document editing application might refuse to release focus without user acknowledgment when the user is in the midst of entering an enterprise rights management password. However, the same application may enable release of focus upon OS request if the user is entering text into an unprotected document (and potentially without first seeking user acknowledgment).

Figure 1:
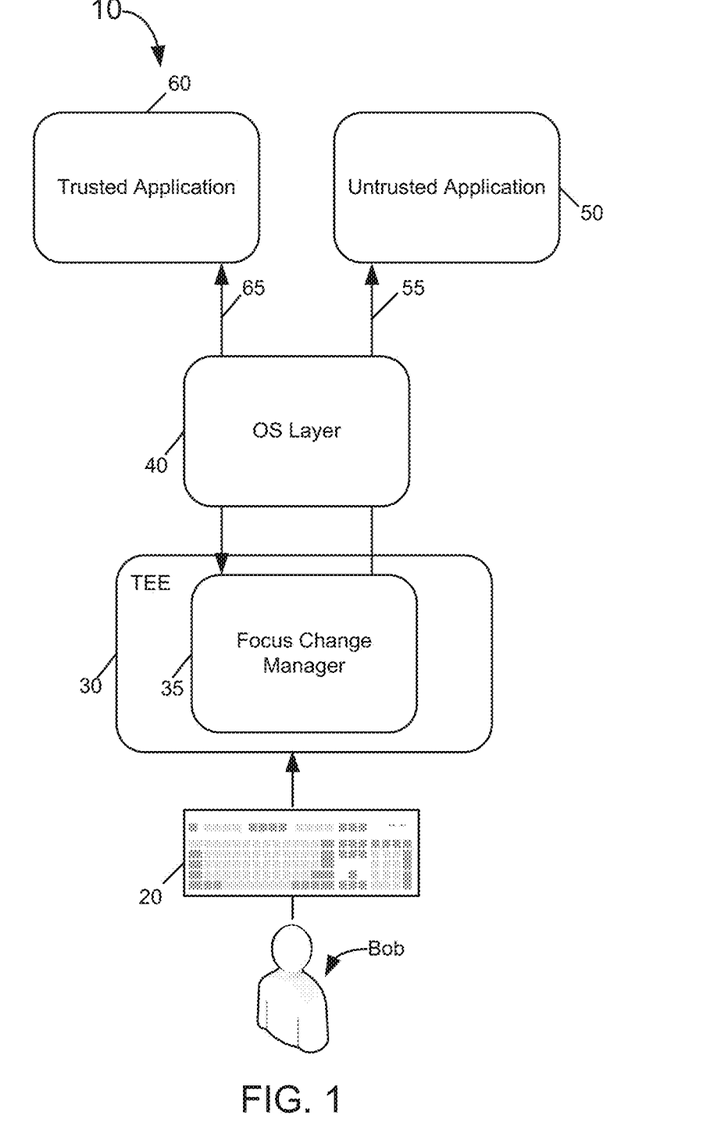
FIG. 1 is a high level view of a system arrangement in accordance with an embodiment of the present invention.

Referring now to FIG. 1, shown is a high level view of a system arrangement in accordance with an embodiment of the present invention. As shown in FIG. 1, system 10 may take the form of any type of computing device, ranging from a mobile computing device such as smartphone, tablet computer, e-reader or so forth, to laptop computer, desktop computer or server computer. As seen at this high level, a user Bob provides input via a user input device 20. Although shown in FIG. 1 as a keyboard, understand that the user input device may take many forms, including touchscreen, mouse, microphone or any other type of user input device. Note that in some cases, user input device 20 may be a trusted hardware device while in other cases, user input device 20 need not be a trusted hardware device. In some cases, one or more user input devices (including one or more sensors) may be trusted or hardened devices to protect against both malware and hardware attacks. Or the trusted input channel may be realized via software means to protect against software-based attacks with an untrusted input device. Such untrusted or legacy user input device is unmodified for trusted input purposes, and may be vulnerable to hardware attack. When a trusted input device is present, it can be secure against hardware attack, at least as to an internal (non-user-accessible) bus. However both types of input device types are equally secure as to a software attack. Note that when a trusted input device is present (e.g., an encrypting keyboard), a direct channel may be established from device to endpoint (e.g., trusted application).

As further shown in FIG. 1, assume that user Bob is interacting with a trusted application 60 that executes above an OS layer 40. While trusted application 60 may take many forms, for purposes of discussion herein, assume that trusted application 60 is a trusted document editor or a trusted voice over Internet Protocol (VoIP) application. To provide a trusted channel 65 to trusted application 60 from user inputs into user device 20, a trusted execution environment (TEE) 30 is present. Details of example TEEs are described further herein. For purposes of the high level illustration of FIG. 1, note that TEE 30 includes a focus change manager 35, which may be a focus change management logic that executes in this trusted environment. As will be described herein, focus change manager 35 is configured to prevent unauthorized focus changes during trusted application execution. As such, OS layer 40 is prevented from allowing a focus change during trusted application execution to any other entity, whether it be a result of a malware attack or for any other focus change request (without authentication from trusted application 60). In contrast, OS layer 40 typically grants focus requests whenever received, without any determination to whether the focus request is from an authorized agent and/or permitted by current policy.

Still with reference to FIG. 1, OS layer 40 includes various OS drivers, an input stack, and one or more focus application programming interfaces (APIs) which may be used by the OS to grant focus to a particular entity such as a given application. For example, the OS system call may be exposed where a focus change may be requested, e.g., SysCall(REQUEST_FOCUS, Focus_Descriptor). The SysCall( ) interface responds by sending a command to the TEE, which services focus control using the FCM logic. When the FCM logic returns success, the OS SysCall returns success to the requester. Note that as used herein, the term "focus" generally relates to a destination for user or other inputs. Thus as used herein, an application is set to have "focus," when the application is the destination for user input via a focus API, such as the familiar user keystrokes provided to a word processing application, as one example. Understand while shown at this high level in the embodiment of FIG. 1, many variations and alternatives are possible.

Figure 2:
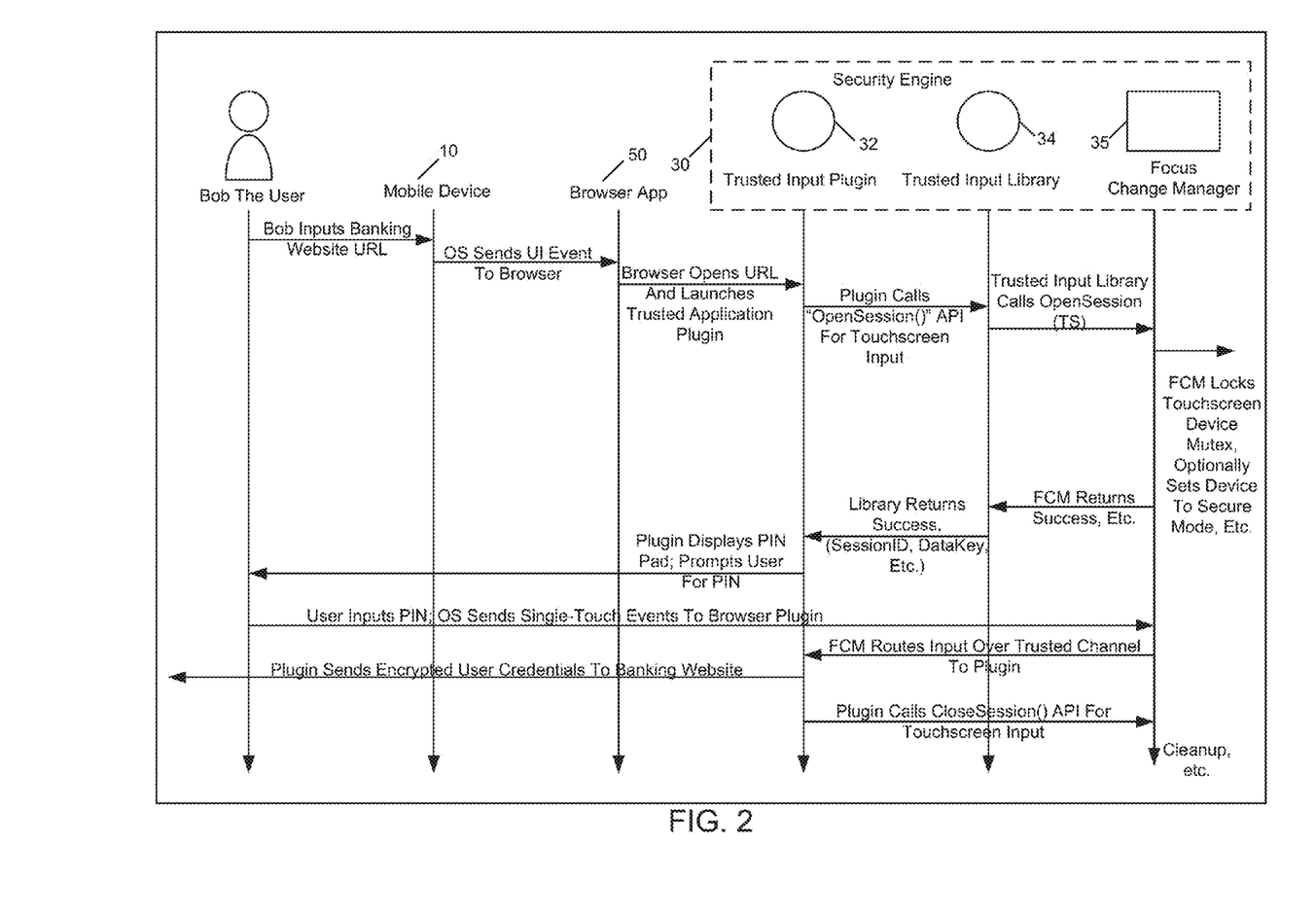
FIG. 2 is an illustration of trusted application focus handling according to an embodiment.

Referring now to FIG. 2, shown is an illustration of trusted application focus handling according to an embodiment. FIG. 2 continues the same enumeration convention of FIG. 1 and thus presents a computing device 10 that includes an untrusted application 50 (in this illustration a browser application), and a TEE 30 (which may be implemented in a security engine of a processor of mobile device 10) that includes a focus change manager 35. As further shown in the illustration of FIG. 2, TEE 30 also includes a trusted input plugin 32 and a trusted input library 34.

In the illustration of FIG. 2, user Bob seeks to access a secure website, such as a bank website. Responsive to this request, the OS sends a user interface event to browser application 50. In turn, recognizing that the website is a trusted website, browser application 50 opens the landing page for the website via a uniform resource locator (URL) and launches trusted input plugin 32. Understand while described as a plugin for a particular development case, instead of a plugin, a complete trusted application may be provided in other cases. In turn, trusted plugin 32 issues an API call, namely a call to an OpenSession( ) API for a trusted input (here in the context of a touchscreen). Responsive to this request, trusted input library 34 calls an OpenSession (TS) for the touchscreen. At this point, focus change manager 35 is informed of the trusted application execution and establishes a trusted channel with the user input device (touchscreen) via a mutual exclusion device (mutex). For example, if a first user has been granted focus control via focus change manager 35, and a second user requests focus control via an OS SysCall( ) focus change manager 35 may use a mutex resource to assign the mutex to the second user. If a third user requests focus control while the second user is assigned the mutex, the third user's request is denied. When the first user gives focus control back to focus change manager 35, the mutex assigns the resource to the second user. Furthermore, focus change manager 35 also may set the input device to a secure mode, such that focus is established between the input device and the trusted application and no other entity is allowed to receive focus (i.e., input) from the user input device. Thus at this time, until (e.g., a CloseSession( ) API), an OS (not shown in FIG. 2) cannot change focus without authorization by trusted application plugin 32.

Still with reference to FIG. 2, at this time focus change manager 35 informs trusted input library 34 regarding the successful establishment of the trusted channel, among potentially other information. For example, focus change manager 35 may inform regarding the trusted device type, name, security level and capabilities of the trusted device connected via the trusted channel. In turn, trusted input library 34 communicates trusted channel establishment success, along with various security information, such as a session ID, data key or so forth to trusted plugin 32. At this point, execution of the trusted application may proceed.

For example, plugin 32 may seek a user authentication such as by password, pin entry or so forth. In certain embodiments, such request from the user may be via a protected audio video path (PAVP) protected channel to prompt for the user input. This user input (e.g., a PIN) is sent via the OS to trusted plugin 32, which as seen is received, via focus change manager 35. In turn, trusted input plugin 32 provides user credentials (e.g., in an encrypted manner) to the website operator. Further operations for the website may occur via trusted input plugin 32. When the user exits from the website, trusted input plugin 32 issues a CloseSession( ) API for the touchscreen input. Responsive to this request from plugin 32, focus control is released from focus change manager 35 back to the OS. Thereafter various cleanup operations may occur as appropriate.

Understand that although not shown for simplicity in FIG. 2, during the trusted application execution, it is possible for a focus change request to be received in the OS from various entities, either proper entities or a malware entity. Regardless of source, any such focus change request received in the OS is provided to focus change manager 35, which may defer the requests to trusted plugin 32 for determination as to whether a focus change requested during trusted application execution is to be allowed or not, e.g., based on policy of the application and a context of the application (possibly including a state of the application execution and the type of content the user is handling in the application). If a focus change request is allowed, trusted plugin 32 may indicate the same to focus change manager 35, which may allow the focus change to occur (by confirmation to the focus change API) to thus allow focus to be directed to another entity while maintaining trusted plugin 32 active. Note that if the trusted application again decides to receive focus, it can request focus from FCM 35, e.g., through an OS SysCall API. In some embodiments, the OS may also expose a direct interface to focus change manager 35 through a device driver.

In cases in which user approval is sought, a high security password field dialog could choose to prompt the user with the following: "Another application wishes to receive keyboard input. Please enter "OK" on your keyboard to stop entering text in this password dialog". Note that a malicious attacker cannot spoof the "OK" acknowledgement because it is coming over a trusted path device (in this case, a keyboard channel), and the user is unlikely to fail to notice the focus change. Embodiments may further be used with other applications such as a voice recognition application using a trusted microphone or trusted sensor hub. In the event that malware attempts to shift focus before the user can enter a password, the trusted application may choose to display a prompt, for example: "Leaving Secure Input Mode. Type "OK" to continue." Understand while shown at this high level in the embodiment of FIG. 2, many variations and alternatives are possible.

Figure 3:
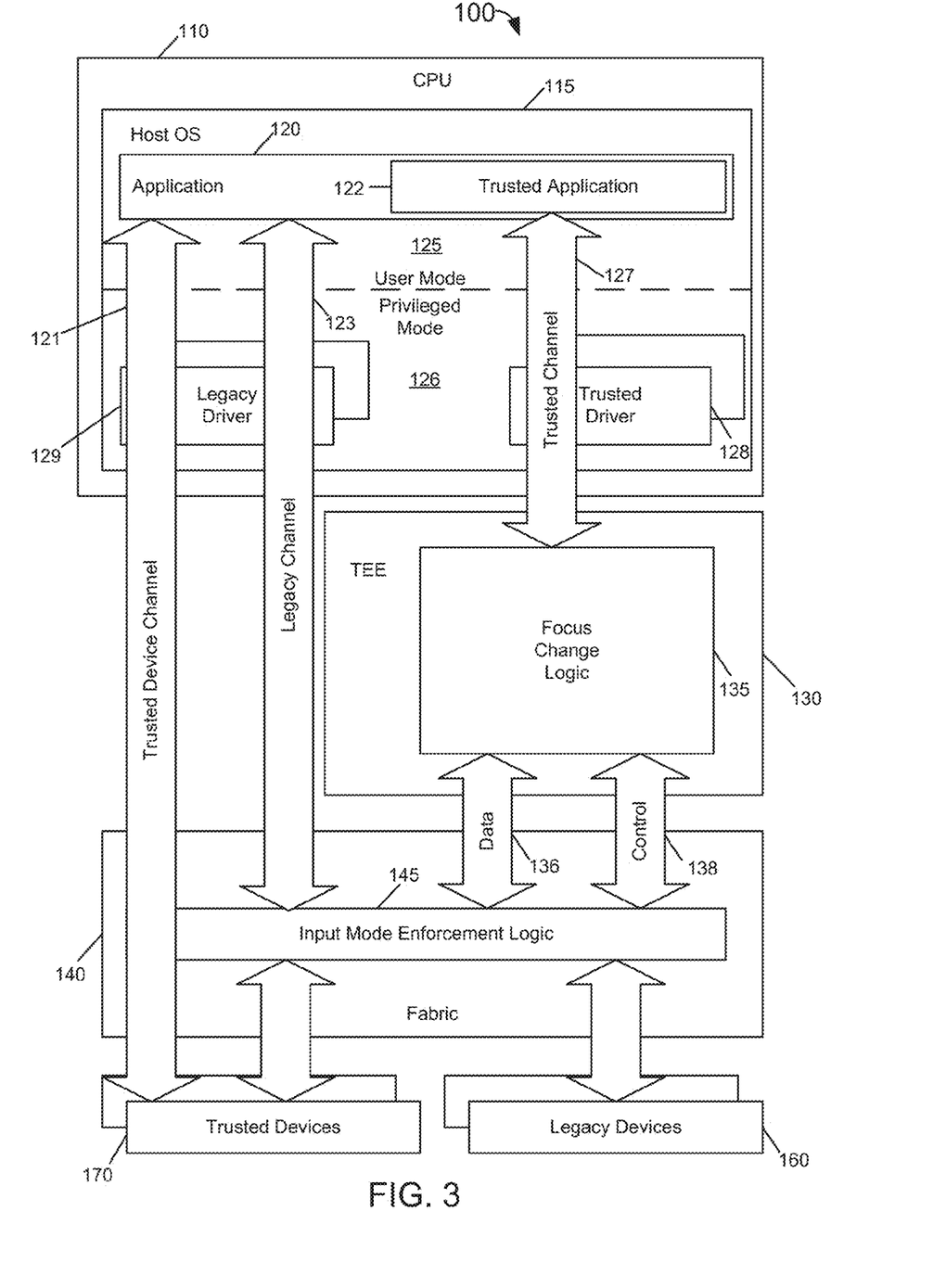
FIG. 3 is a block diagram of a system in accordance with another embodiment of the present invention.

Referring now to FIG. 3, shown is a block diagram of a system in accordance with another embodiment of the present invention. As shown in FIG. 3, system 100 may take the form of any type of computer device, ranging from mobile device such as smartphone, tablet or so forth to a desktop computer, server computer or the like. As seen, system 100 includes a central processing unit (CPU) 110, which may be a given general-purpose processor. Understand that CPU 110 may further include one or more security engines, generally illustrated as a TEE 130. Note that while TEE 130 is shown as a separate component (and may be a separate integrated circuit (IC) in some embodiments), more commonly TEE may be implemented within CPU 110.

With reference to CPU 110, one or more cores of the processor may be configured to execute a host OS 115. In general, OS 115 may be segmented into a user mode 125 in which one or more user-based applications execute, and a privileged mode 126 in which OS kernel functions and other supervisor operations occur. In the embodiment shown, privileged mode 126 includes one or more legacy drivers 129 to provide an interface to legacy devices 160 of the system, such as various peripheral devices, including one or more user interface devices. In turn, one or more trusted drivers 128 are present in privileged mode 128 to provide an interface to trusted devices 170 and/or legacy devices 160 in a TEE in which trusted application 122 is the focus.

With further reference to host OS 115, user mode 125 may provide for execution of various applications 120. In the embodiment shown, such applications include a trusted application 122, which acts as an endpoint for trusted user input as described herein. Note that in other cases, a trusted application endpoint may not be present and instead, an endpoint for receipt of trusted input may be at a remote location, such as a cloud-based location by way of a secure internet connection to a cloud-based resource, such as a server computer present at an endpoint data center, such as an enterprised data center.

Still with reference to FIG. 3, via the various drivers, different channels can be established between destination endpoints (within application layer 120) and various devices coupled to CPU 110, including one or more trusted devices 170 and one or more untrusted or legacy devices 160. For purposes of discussion herein, assume that these devices are user input devices such as keyboards, microphones, touchscreens, gesture recognition devices or other forms of user input devices. Such devices couple through a fabric 140, which may be one or more input buses or other interconnects.

To control enforcement of various modes including a security mode and an unsecure mode, TEE 130 includes a focus change logic 135 (such as a FCM as described herein) to establish control and data paths 136 and 138, respectively with an input mode enforcement logic 145 of fabric 140 which thus may establish appropriate channels, including a trusted device channel 127 (in which legacy devices 160 provide user input via trusted channel 127 to trusted application 122). Note for trusted devices 170, a separate trusted device channel 121 may be provided such that a direct trusted channel between trusted devices 170 and application layer 120 is present. For untrusted input and/or in a non-trusted mode, an untrusted channel 123 may provide user input to application layer 120.

Thus as shown in FIG. 3, each device (160 or 170) connects to fabric 140 and is enabled with a mode capability which allows focus change logic 135 to control whether the device's input flows over legacy channel 123, trusted channel (121 or 127), both, or neither. For example, a device such as a USB keyboard can connect to an embedded controller (EC) enabled mode capability. In turn the EC couples to CPU 110 via a low pin count/PS2 bus, and to TEE 130 via a private system management bus (SMBus). This configuration has the capability to enable either legacy input (via PS/2 KB), trusted input (via SMBus to the security engine), both, or neither. Other examples include a modified extended host controller interface (xHCI) or a protected input/output (I/O) memory data space associated with a trusted entity such as a micro-virtual machine monitor (uVMM).

Legacy channel 123, when enabled, sends data over legacy paths, for example, a host OS PS/2 driver, keyboard stack, etc. Note that for confidential or secure input, this channel is disabled or at least limited to select keystrokes/events. In turn, trusted data flows from the mode enabled bus to focus change logic 135, which provides trusted channels to the trusted input endpoint. In the illustration of FIG. 3, the endpoint is trusted application 122 in the application domain 120. However in other cases the endpoint could be at a cloud-based location, or in the TEE itself. Focus change logic 135 is responsible for handling data flow across a trusted channel, for example, it may encrypt data for transmission to a secure enclave, or perform parsing for a touchscreen before encryption.

Note that in the embodiment of FIG. 3, trusted driver 128 is not actually in the TCB, but acts as a simply a pass-through for the trusted channel. Although trusted channel 127 is shown as a single channel, in other embodiments having two endpoints seeking separated TCBs each may have a private trusted channel with focus change logic 135. Each device/bus combination may have a different underlying hardware design or implementation. Note that in some cases, certain of the agents shown in FIG. 3 may interact with other components of a system such as host OS service module(s), device-specific (e.g., driver) code in TEE 130, fabric policy enforcement logic, among others.

Understand while shown at this high level in the embodiment of FIG. 3, many variations and alternatives are possible.

Figure 4:
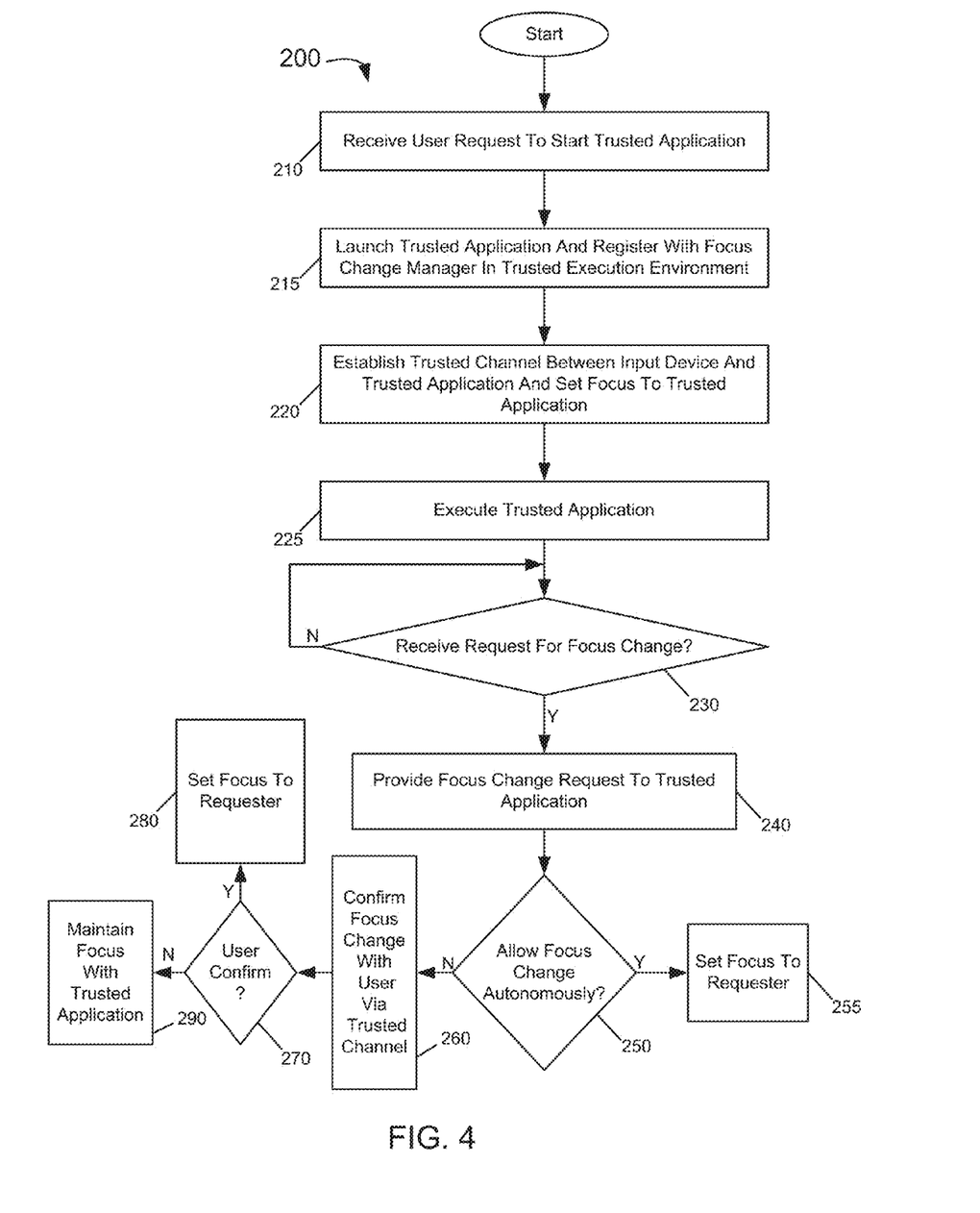
FIG. 4 is a flow diagram of a method for controlling focus in accordance with an embodiment of the present invention.

Referring now to FIG. 4, shown is a flow diagram of a method for controlling focus in accordance with an embodiment of the present invention. As shown in FIG. 4, method 200 may be performed by combinations of hardware, software and/or firmware, including focus change logic of a security engine, as well as interaction with other hardware and/or software as described herein. As seen, method 200 begins by receiving a user request to start a trusted application (block 210). Such user request may be received from a given user input device. As examples, the trusted application can be a trusted email application, trusted word processing application, trusted VoIP application among others.

Next control passes to block 215 where the trusted application is launched. This launched application also may be registered with a focus change manager in the TEE (block 215). Thereafter, control passes to block 220 where a trusted channel is established between input device and the trusted application. In an embodiment, the focus change manager may establish this trusted channel. In addition, focus may be set to the trusted application such that user input via the user input device is provided (through focus change manager and focus API of an OS to the trusted application).

Thus at this point correct initialization is realized and trusted application execution can begin (block 225). During such execution, it can be determined whether a request for a focus change has been received (diamond 230). If so, control passes to block 240 where the focus change request may be provided to the trusted application (e.g., from a focus change API). Thereafter, the trusted application may determine whether to allow the focus change to occur. More specifically, diamond 250 determines based on policy and/or user context, whether the trusted application itself can determine whether this focus change is to be allowed autonomously (without user involvement). If so, and it is determined that this focus change is to be allowed, control passes to block 255 where the focus may be set to the requester. As such, incoming user input can be redirected via the focus API to the requester (e.g., an untrusted application) (and if the application determines that no charge is allowed, focus stays with the application).

Still with reference to FIG. 4, if instead a focus change is not to be allowed autonomously, control passes to diamond 260 to confirm the focus change with the user via the trusted channel. At diamond 270 it is determined whether the user has confirmed, e.g., by assenting to the change of destination for user input. If so, control passes to block 280 where the focus may be set to the requester. Otherwise, this focus change request is ignored and control passes to block 290 where focus remains with the trusted application. Thus in this case assuming that a malware component sought the focus change, no bad action occurs and malware is prevented from receiving protected user input. Embodiments thus provide trustworthy input focus change control with an untrusted OS. Understand while shown at this high level in the embodiment of FIG. 4, many variations and alternatives are possible.

Figure 5:
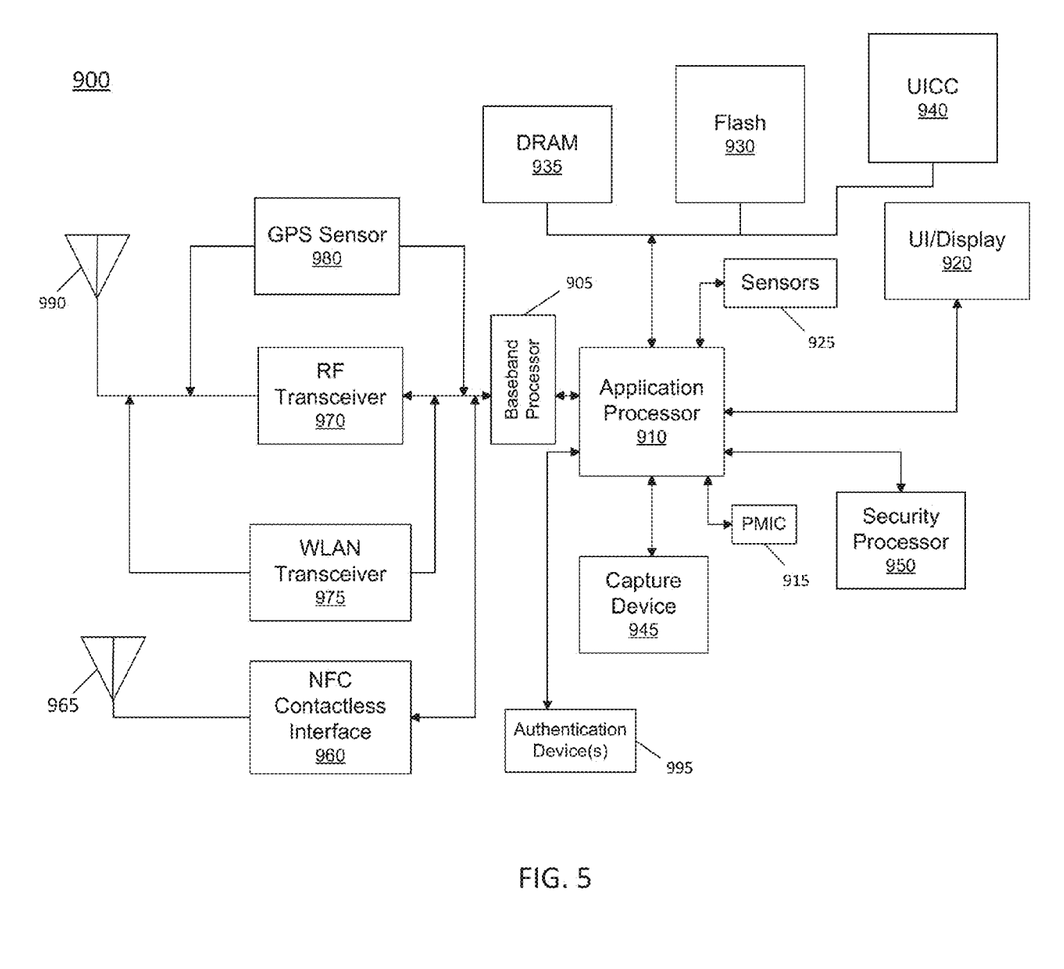
FIG. 5 is a block diagram of an example system with which embodiments can be used.

Embodiments may be implemented in an SoC or other processor for incorporation into a wide variety of platforms. Referring now to FIG. 5, shown is a block diagram of an example system with which embodiments can be used. As seen, system 900 may be a smartphone or other wireless communicator. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device. In the context of trusted input protection, understand that application processor 910 may be an SoC including a security processor and/or other protection logic to protect against focus change attacks, as described herein.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. As further seen, application processor 910 also couples to a capture device 945 such as one or more image capture devices that can record video and/or still images.

Still referring to FIG. 5, a universal integrated circuit card (UICC) 940 comprises a subscriber identity module, which in some embodiments includes a secure storage to store secure user information. System 900 may further include a security processor 950 that may couple to application processor 910. In various embodiments, security processor 950 may be used in part to set up a TEE. A plurality of sensors 925 may couple to application processor 910 to enable input of a variety of sensed information such as accelerometer and other environmental information. In addition, one or more authentication devices 995 may be used to receive, e.g., user biometric input for use in authentication operations, which may be received via a trusted input path.

As further illustrated, a near field communication (NFC) contactless interface 960 is provided that communicates in a NFC near field via an NFC antenna 965. While separate antennae are shown in FIG. 5, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 6:
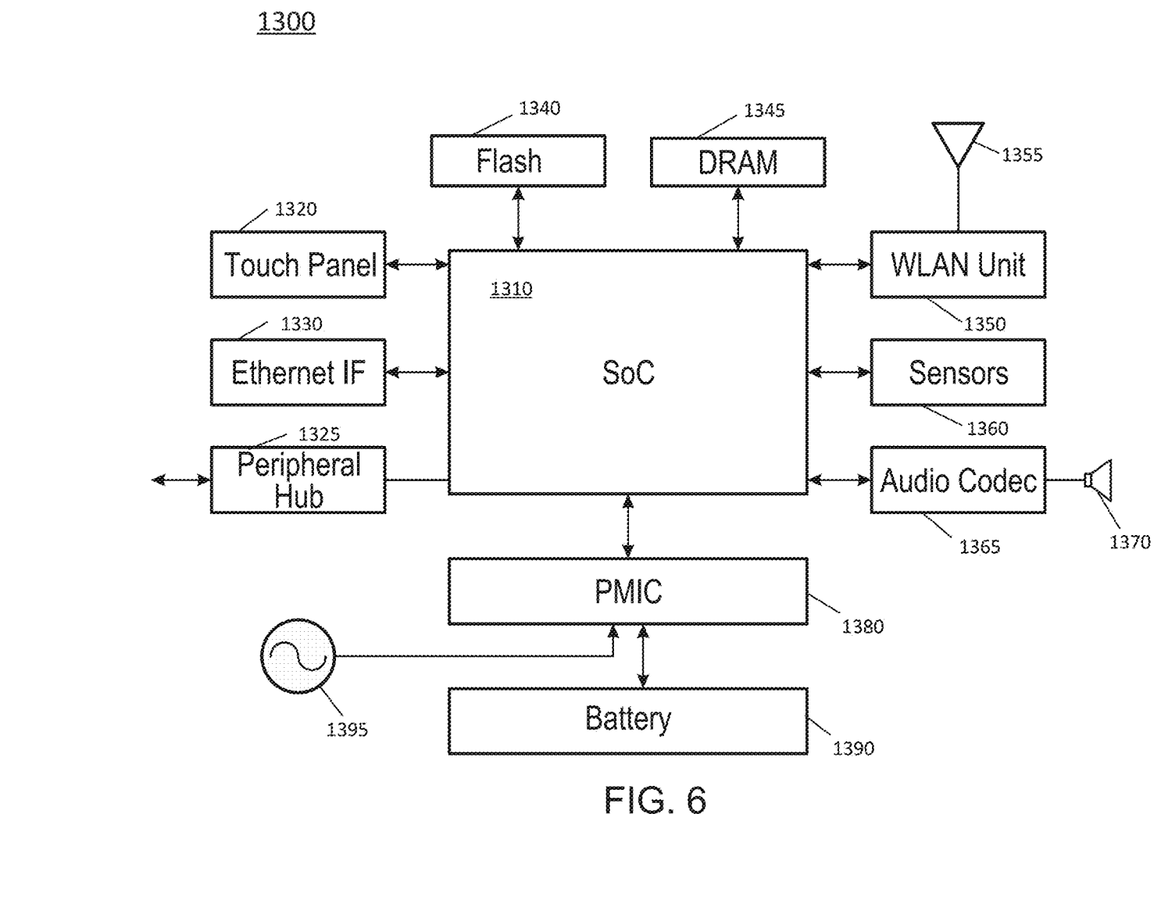
FIG. 6 is a block diagram of an example system with which embodiments may be used.

Referring now to FIG. 6, shown is a block diagram of an example system with which embodiments may be used. In the illustration of FIG. 6, system 1300 may be mobile low-power system such as a tablet computer, 2:1 tablet, phablet or other convertible or standalone tablet system. As illustrated, a SoC 1310 is present and may be configured to operate as an application processor for the device. SoC 1310 may include hardware, software, and/or firmware as described herein to provide protection against focus change attacks.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 6, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 6, many variations and alternatives are possible.

Figure 7:
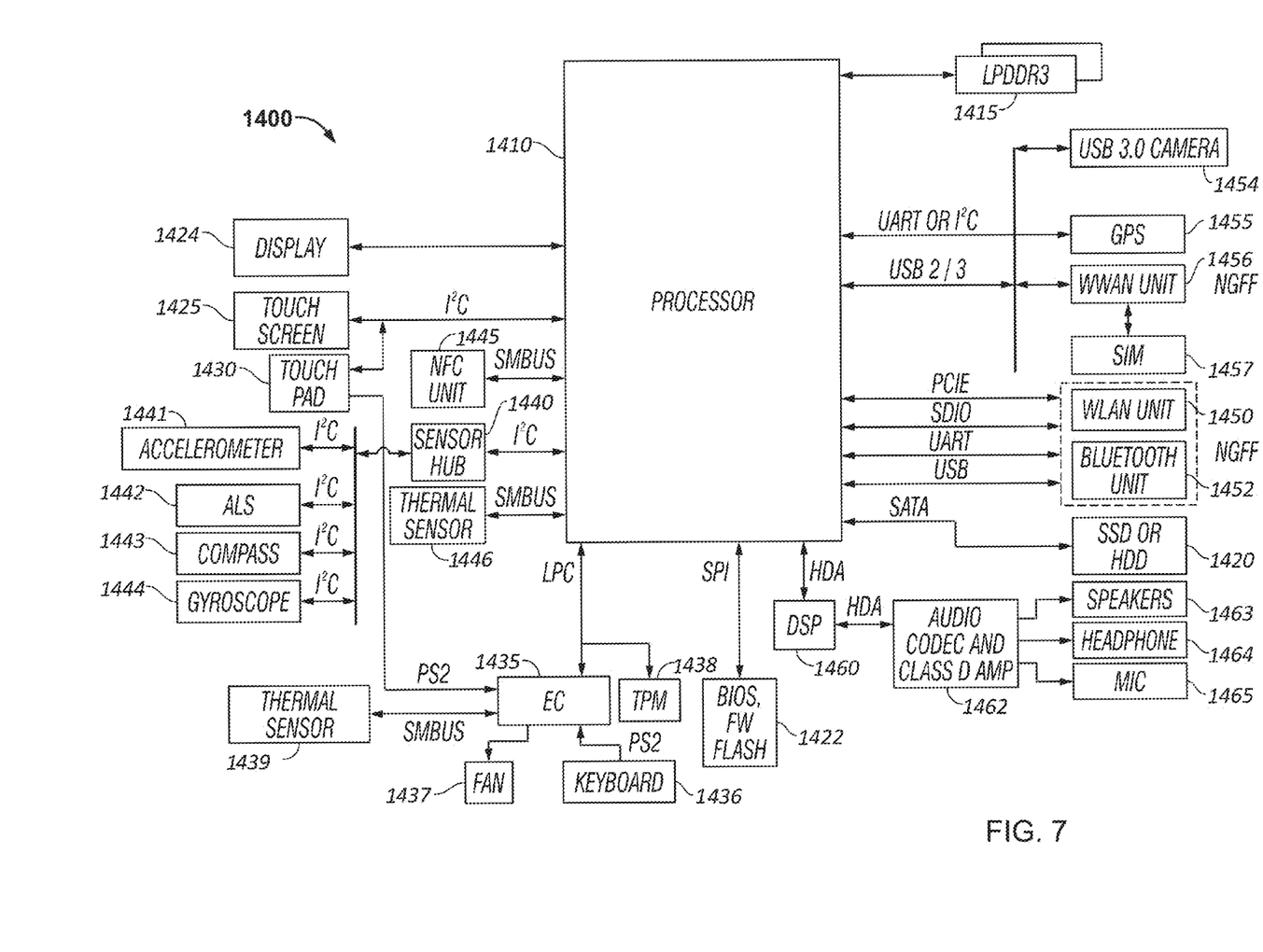
FIG. 7 is a block diagram of a representative computer system.

Referring now to FIG. 7, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC. Processor 1400 may include hardware, software, and/or firmware as described herein to provide focus change attack protection.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 7, a flash device 1422 may be coupled to processor 1410, e.g., via a serial peripheral interface (SPI). This flash device may provide for non-volatile storage of system software, including a basic input/output software (BIOS) as well as other firmware of the system, which may be segmented into portions as described herein. Flash device 1422 also may store a set of manifests as described herein.

Various input/output (I/O) devices may be present within system 1400. Specifically shown in the embodiment of FIG. 7 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I2C interconnect. As further shown in FIG. 7, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 7, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 7, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 7, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 7, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 7, WWAN unit 1456 and an integrated capture device such as a camera module 1454 may communicate via a given USB protocol such as a USB 2.0 or 3.0 link, or a UART or I2C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC)

and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system, and coupled via a protected input path to provide protection against focus change attacks as described herein. Note also that audio outputs can be provided from amplifier/CODEC 1462 to a headphone jack 1464. Although shown with these particular components in the embodiment of FIG. 7, understand the scope of the present invention is not limited in this regard.

Figure 8:
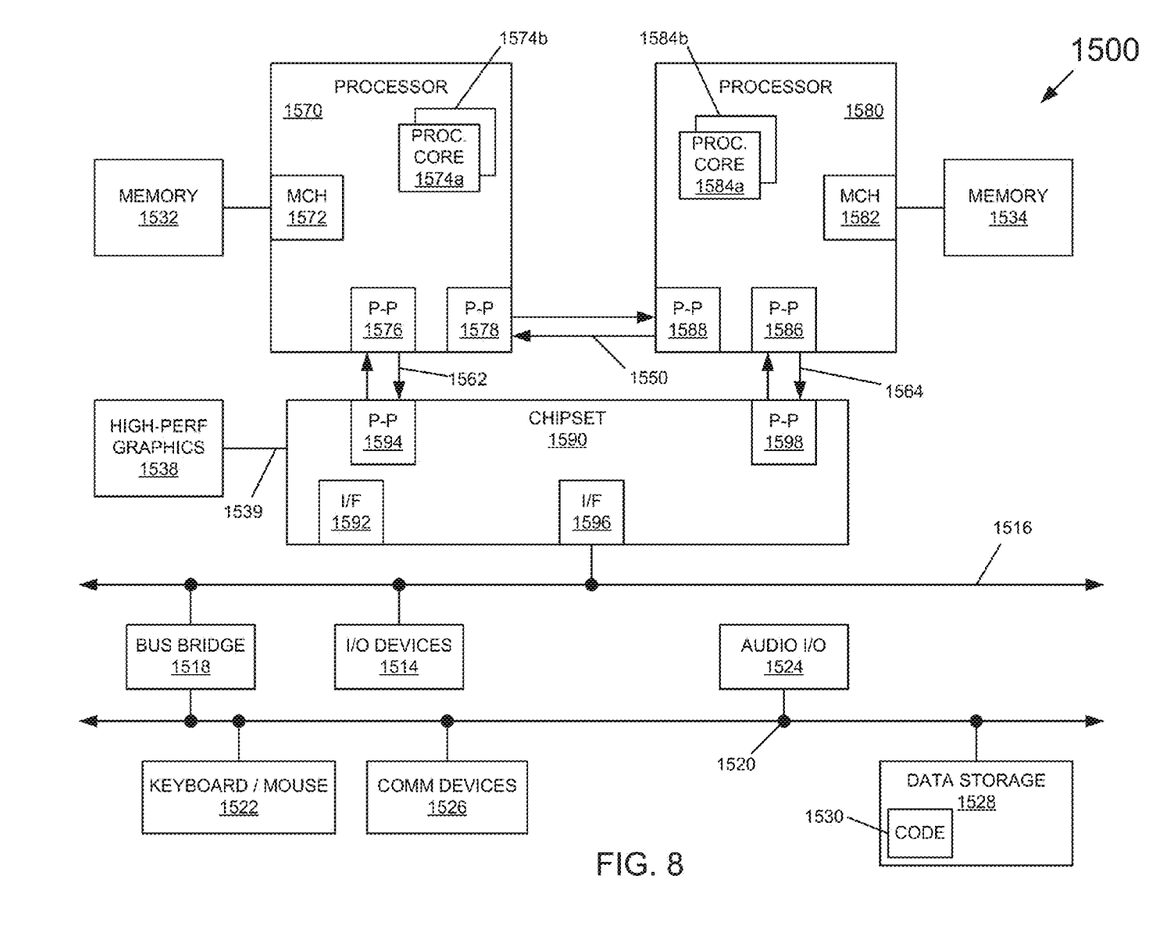
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 1500 is a point-to-point interconnect system, and includes a first processor 1570 and a second processor 1580 coupled via a point-to-point interconnect 1550. As shown in FIG. 8, each of processors 1570 and 1580 may be multicore processors, including first and second processor cores (i.e., processor cores 1574a and 1574b and processor cores 1584a and 1584b), although potentially many more cores may be present in the processors. Each of the processors can include hardware and logic to perform the focus change attack prevention described herein.

Still referring to FIG. 8, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 8, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 8, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 8, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530 and one or more manifests, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following Examples pertain to further embodiments.

In Example 1, an apparatus comprises: a processor including at least one core and a security engine, the security engine having a focus change logic to inform a trusted application to be executed in a trusted execution environment of a request for a focus change during execution of the trusted application, enable the focus change to occur during execution of the trusted application when allowed by the trusted application, and otherwise to prevent the focus change.

In Example 2, the apparatus of Example 1 further comprises a first user input device coupled to the processor, where the focus change logic is to enable a trusted channel to be established between the first user input device and the trusted application.

In Example 3, the focus change logic of Example 2 is to enable the trusted channel to be established responsive to a request for focus from the trusted application.

In Example 4, the focus change logic of one of Examples 2 or 3 is to set the first user input device to a secure mode to enable communication of user input information via the trusted channel during execution of the trusted application.

In Example 5, the focus change logic of Example 2 is to set the first user input device to a non-secure mode to enable communication of user input information via an untrusted channel during execution of an untrusted application.

In Example 6, the apparatus of any of the above Examples 2-5 further comprises an enforcement logic to set the first user input device to a secure mode to enable communication of user input information via the trusted channel during execution of the trusted application and set the first user input device to a non-secure mode to enable communication of the user input information via an untrusted channel during execution of an untrusted application.

In Example 7, the first user input device optionally comprises a trusted input device to provide secure user input directly to the trusted application via the trusted channel.

In Example 8, the first user input device optionally comprises an untrusted user input device to provide untrusted user input to the focus change logic, the focus change logic to provide the user input to the trusted application via the trusted channel.

In Example 9, the focus change logic is to receive the request for the focus change from an OS during execution of the trusted application and send the request for the focus change to the trusted application.

In Example 10, the trusted application is to access a policy storage responsive to receipt of the request for the focus change to determine whether to allow the focus change to occur.

In Example 11, the policy logic is to determine whether to seek user approval of the request for the focus change, based at least in part on a security level of information processed in the trusted application.

In Example 12, a method comprises: registering a trusted application with a focus change manager of a security engine of the system; establishing a trusted channel between a user input device of the system and the trusted application and setting a focus to the trusted application; determining, in the trusted application, whether to allow a change of the focus to another entity during execution of the trusted application; and if the change of the focus is determined to be allowed, enabling user input from the user input device to be provided to the another entity via an untrusted channel.

In Example 13, the method further comprises, if the change of the focus is determined to not be allowed, preventing the user input from being provided to the another entity.

In Example 14, the method further comprises determining whether to allow the change of the focus based on one or more of policy information of a policy associated with the trusted application and a security level of information being processed in the trusted application.

In Example 15, the method optionally further comprises: receiving a request for the change of the focus from an operating system in communication with the another entity; responsive to determination that the change of the focus is to be allowed, setting the focus to the another entity; requesting, by the trusted application, re-acquisition of the focus; and responsive to the request, setting the focus to the trusted application after removal of the focus from the another entity.

In Example 16, a machine-readable storage medium including machine-readable instructions, when executed, is to implement a method as claimed in any one of above Examples.

In Example 17, a method comprises: entering, by a trusted input control logic, a trusted input mode of a system including at least one user input device and a processor to execute a trusted application, where in the trusted input mode a trusted channel is provided between the at least one user input device and the trusted application; receiving, in the trusted input control logic, user input from the at least one user input device via the trusted channel, protecting the user input and providing the protected user input to the trusted application; and responsive to an indication of a focus change request, determining, in the trusted application, whether to provide additional user input to an untrusted application.

In Example 18, the method further comprises determining whether to provide the additional user input to the untrusted application based at least in part on user approval.

In Example 19, the method further comprises responsive to determining to provide the additional user input to the untrusted application, causing a focus change from the trusted application to the untrusted application and enabling the additional user input to be provided to the untrusted application, while the trusted application continues execution.

In Example 20, the method further comprises responsive to the indication of the focus change request, providing a notification to a user regarding a change in input mode.

In Example 21, the method of Example 20 optionally further comprises, where the notification includes a request for the user to confirm whether to provide the additional user input to the untrusted application, and responsive to receipt of the user confirmation, causing a focus change to the untrusted application.

In Example 22, a machine-readable storage medium including machine-readable instructions, when executed, is to implement a method as claimed in any one of above Examples.

In Example 23, a system comprises: trusted input control means for entering a trusted input mode of a system including at least one user input means and a processor means for executing a trusted application; means for providing, in the trusted input mode, a trusted channel between the at least one user input means and the trusted application; means for receiving user input from the at least one user input means via the trusted channel, means for protecting the user input and providing the protected user input to the trusted application; and responsive to an indication of a focus change request, means for determining whether to provide additional user input to an untrusted application.

In Example 24, the system further comprises means for determining whether to provide the additional user input to the untrusted application based at least in part on user approval.

In Example 25, the system further comprises means for causing a focus change from the trusted application to the untrusted application and enabling the additional user input to be provided to the untrusted application.

In Example 26, the system further comprises means for providing a notification to a user regarding a change in input mode.

In Example 27, where the notification includes a request for the user to confirm whether to provide the additional user input to the untrusted application, and responsive to receipt of the user confirmation, the means for causing the focus change to the untrusted application is to enable the focus change.

Understand also that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a system to:
    register a trusted application with a focus change manager of a hardware security engine of the system;
    establish a trusted channel between a user input device of the system and the trusted application and set a focus to the trusted application to enable user input via the user input device to be provided to the trusted application;
    execute the trusted application on a hardware processor of the system;
    determine, in the trusted application, whether to allow a change of the focus to another entity during the execution of the trusted application; and
    if the change of the focus is determined to be allowed, enable the user input from the user input device to be provided to the another entity via an untrusted channel.

2. The at least one non-transitory computer readable medium of claim 1, further comprising instructions that when executed enable the system, if the change of the focus is determined to not be allowed, to prevent the user input from being provided to the another entity.

3. The at least one non-transitory computer readable medium of claim 1, further comprising instructions that when executed enable the system to determine whether to allow the change of the focus based on one or more of policy information of a policy associated with the trusted application and a security level of information being processed in the trusted application.

4. The at least one non-transitory computer readable medium of claim 1, further comprising instructions that when executed enable the system to:
receive a request for the change of the focus from an operating system in communication with the another entity;
responsive to determination that the change of the focus is to be allowed, set the focus to the another entity;
request, by the trusted application, re-acquisition of the focus; and
responsive to the request, set the focus to the trusted application after removal of the focus from the another entity.

5. A method comprising:
entering, by a trusted input control hardware logic, a trusted input mode of a system including at least one user input device and a hardware processor to execute a trusted application, wherein in the trusted input mode a trusted channel is provided between the at least one user input device and the trusted application;
receiving, in the trusted input control hardware logic, user input from the at least one user input device via the trusted channel, protecting the user input and providing the protected user input to the trusted application;
responsive to an indication of a focus change request, providing a notification to a user regarding a change in input mode, the notification including a request for the user to confirm whether to provide additional user input to an untrusted application, and determining, in the trusted application, whether to provide the additional user input to the untrusted application; and
responsive to receipt of the user confirmation, causing a focus change to the untrusted application.

6. The method of claim 5, further comprising determining whether to provide the additional user input to the untrusted application based at least in part on user approval.

7. The method of claim 6, further comprising responsive to determining to provide the additional user input to the untrusted application, causing the focus change from the trusted application to the untrusted application and enabling the additional user input to be provided to the untrusted application, while the trusted application continues execution.

8. A computing system comprising:
a processor having at least one core and a security engine;
at least one user input device;
a non-transitory storage medium coupled to the processor, the non-transitory storage medium comprising instructions that when executed enable the processor to:
enter a trusted input mode, wherein in the trusted input mode a trusted channel is provided between the at least one user input device and a trusted application;
receive user input from the at least one user input device via the trusted channel, protect the user input and provide the protected user input to the trusted application;
responsive to an indication of a focus change request, provide a notification to a user regarding a change in input mode, the notification including a request for the user to confirm whether to provide additional user input to an untrusted application and determine, in the trusted application, whether to provide the additional user input to the untrusted application; and
responsive to receipt of the user confirmation, cause a focus change to the untrusted application.

9. The computing system of claim 8, wherein the security engine comprises focus change logic to enable the trusted channel to be established between the at least one user input device and the trusted application.

10. The computing system of claim 9, wherein the focus change logic is to enable the trusted channel to be established responsive to a request for focus from the trusted application.

11. The computing system of claim 9, wherein the focus change logic is to set the at least one user input device to a secure mode to enable communication of user input information via the trusted channel during execution of the trusted application.

12. The computing system of claim 11, wherein the focus change logic is to set the at least one user input device to a non-secure mode to enable communication of user input information via an untrusted channel during execution of the untrusted application.

* * * * *